United States Patent Office 2,880,654
Patented Apr. 7, 1959

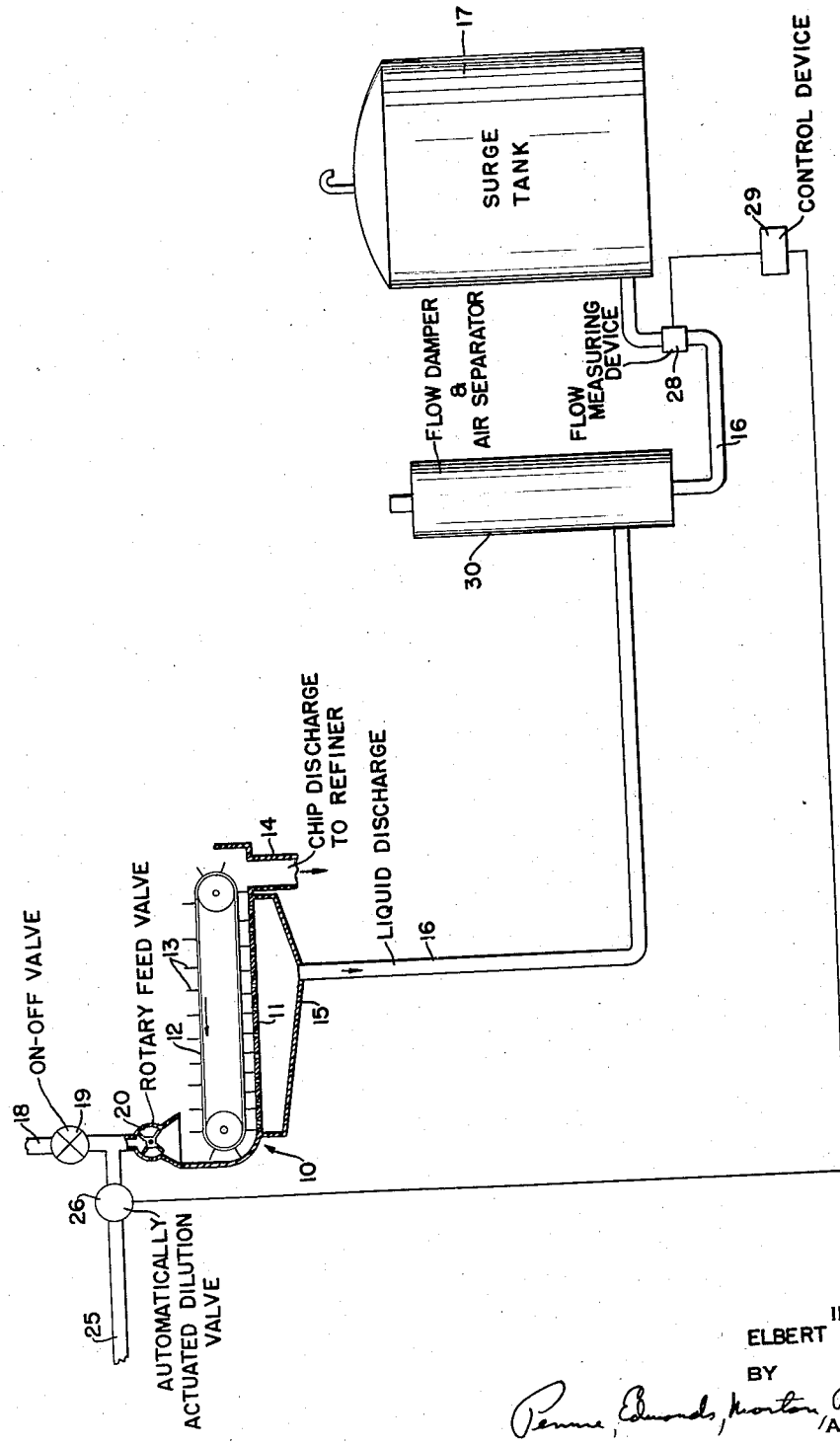

2,880,654

CONSISTENCY REGULATING SYSTEM

Elbert A. Henry, Jr., Acme, N.C., assignor to Riegel Paper Corporation, New York, N.Y., a corporation of Delaware Application November 1, 1955, Serial No. 544,194

10 Claims. (Cl. 92—46)

This invention relates to regulation or control, e.g. in a paper-making process, of the amount of solids supplied to a refiner from a suspension thereof in a liquid. More particularly the invention is concerned with the regulation of the consistency of a solids-liquid suspension fed to a device for separating the solids and liquid components thereof so that the quantity of solids discharged by the separating device to a refiner may be substantially uniformly maintained at a predetermined value. The invention is especially involved with the control or regulation of the consistency of a wood chip suspension volumetrically metered to a drainer conveyor, which separates the liquid and chip components thereof and feeds the former to a refiner such as a Jordan engine, so that the quantity of chips fed to the refiner is accurately controllable.

Heretofore considerable difficulty has been experienced in maintaining a uniform consistency of a chip suspension that is fed by a volumetric metering device to a drainer conveyor for separating the components thereof. Yet this is important since any variation in the consistency of the suspension volumetrically metered to the drainer conveyor causes a proportional variation in the quantity of chips discharged from the conveyor to a refiner. It is the principal object of my invention to avoid such variations in the quantity of chips fed to a refiner except when a variation is specifically desired.

Broadly, therefore, my invention involves a measuring of the quantity of liquid separated from a chip suspension by a drainer conveyor and a regulation of the consistency of the chip suspension fed to the drainer conveyor in accordance with such measurement.

More specifically, my invention involves the provision in a chip suspension separating system having a volumetric metering feed, of means for adding liquid to the suspension prior to metering as the liquid discharged from the separating system decreases in quantity whereby the quantity of chips separated may be maintained at a predetermined value for a given rate of feed of the suspension to the separating system. In order to avoid inaccuracies, provision is made to remove any air entrained in the liquid discharged from the suspension separating means and to dampen rapid flow variations thereof. My invention includes, of course, in addition to a method of regulating the consistency of a chip suspension, an apparatus for carrying out the method.

For a more detailed description of my invention, reference may be made to the accompanying drawing illustrating rather schematically and somewhat in flow diagram form an aparatus coming within its scope.

In the drawing, a drainer conveyor is identified generally by the reference numeral 10. It includes a screen 11 over which a chip suspension may be passed by a conveyor belt 12 provided with fins 13 of rubber or the like. In passage over screen 11 the liquid component of the suspension passes therethrough while the chip component is carried thereacross and discharged through a discharge conduit 14 from which it is passed to a refiner or the like. The liquid component of the suspension is collected beneath screen 11 in a trough 15 having an outlet conduit 16 and is carried by the latter to a surge tank 17 for collection.

The chip suspension is provided through a supply conduit 18 and an on-off valve 19 to a rotary positive displacement valve 20 by which it is fed in volumetrically metered amounts to the inlet end of the drainer conveyor 10. By changing the rate of rotation of rotary valve 20, the quantity of chip suspension fed to the drainer conveyor during any period of time can of course be changed. It will be clear, however, that for a given rate of rotation of valve 20, a change in consistency of the chip suspension fed therethrough to the drainer conveyor will result in variations both in the amount of chips discharged through discharge conduit 14 and the amount of liquid discharged through discharge conduit 16. Consequently, if it is desired to maintain a given rate of discharge of chips from the drainer conveyor for a given amount or quantity of chip suspension fed thereto, it will be apparent that the consistency of the chip suspension fed through valve 20 must be maintained constant.

As mentioned hereinbefore, it is the object of my invention to provide for a regulation of the consistency of the chip suspension fed by rotary valve 20 to the drainer conveyor so that, for example, for a given rate of operation of the rotary valve, the quantity of chips discharged by the drainer conveyor may be maintained constant. To accomplish this, a conduit 25 is provided to permit addition of liquid to the suspension upstream of rotary valve 20 to increase the liquid component thereof. An automatically actuated valve 26 of any conventional well known form is provided to control the flow of liquid through conduit 25. A flow measuring device 28, which may also be of any of a number of such devices that are well known and conventional, is provided in conduit 16 to measure the amount or rate of flow of the liquid component separated from the chip component of the chip suspension fed by rotary valve to the drainer conveyor. A controlling device 29, which may also be of conventional form, e.g. a Model No. 40 Foxboro controller manufactured by The Foxboro Company of Foxboro, Mass., is employed to interconnect flow measuring device 28 and automatically operated valve 26 so that the latter is operated in accordance with the operation of the former as a result of a flow of liquid therethrough. Hence the amount of liquid added to the chip suspension prior to its being metered onto the drainer conveyor by rotary valve 20 is controlled in accordance with the rate of flow of liquid separated by the drainer conveyor and discharged through conduit 16 to collecting tank 17. The liquid that may be added through conduit 25 may advantageously be taken from that collected in collection tank 17. In order to assure accuracy of the measurement of liquid being separated by the drainer conveyor from the chip suspension regardless of temporary rapid flow variations and the presence of varying amounts of entrained air therein, a conventional flow damper and air separator 30 is inserted in discharge conduit 16 intermediate the drainer conveyor 10 and the flow measuring device 28.

The operation of the apparatus will now be described. Assume that it is desired to supply a refiner with chips from the discharge conduit 14 of drainer conveyor 10 at a constant rate for a constant rate of feed of chip suspension to the drainer conveyor through rotary valve 20 despite the variations in the consistency of the chip suspension as provided through conduit 18 and valve 19. Assume further that the minimum consistency of the suspension that will be supplied through conduit 18 and valve 19 (that is the consistency of a suspension having the minimum amount of chip component) is determinable and that the controlling device 29 is so set that for this consistency value no liquid will be added through conduit 25. Then if the consistency of the suspension supplied through conduit 18 increases, which would effect an increase in the amount of chips discharged through discharge conduit 14 of the drainer conveyor, the amount of liquid separated therefrom by the drainer conveyor 10 will decrease and hence the flow through flow measuring device 28 will decrease and controlling device 29 will effect a regulated opening of valve 26 to permit the addition of liquid to the suspension through conduit 25, thereby effecting a decrease in the consistency of the suspension fed through rotary valve 20. While the correction of the consistency of the suspension for a constant rate of chip discharge is not immediate, as will be apparent, it is fast enough to be of substantial utility.

Now if it is desired to change the rate of discharge of chips from the drainer conveyor to the refiner, the rate of rotation of feed valve 20 may be changed and control device 29 changed to correspond thereto. For this purpose it is contemplated that each of the rotary feed valve 20 and the control device 29 can be calibrated correspondingly so that for a change in setting of one, the other may be readily and quickly correspondingly changed so that the consistency of the suspension supplied to the rotary feed valve will be regulated again in accordance with the amount of liquid separated therefrom by the drainer conveyor to assure the discharge of the desired amount of chips to the refiner.

While the accuracy of the feed of chips to a refiner by the above described system is dependent to a certain extent upon the uniformity of the consistency of the chips leaving the drainer conveyor, the errors introduced by slight variations of the drained chip consistency will be minor since the consistency at this point is relatively uniform.

I claim:

1. In a paper making process, the method of controlling the volumetric rate of flow of cellulosic material which comprises continuously metering, at a constant rate, a liquid suspension of the cellulosic material, continuously separating at least a portion of the liquid from the metered suspension, directing the separated liquid in a continuous stream, measuring the rate of flow of the separated liquid in said stream, and automatically adjusting the concentration of the cellulosic material in the liquid suspension prior to metering by adding liquid to the suspension in accordance with the rate of flow of said separated liquid.

2. A method according to claim 1 in which the liquid is added to the liquid suspension in inverse proportion to the rate of flow of separated fluid in said stream.

3. A method according to claim 1 in which the metering of said suspension is by volume.

4. A method according to claim 1 in which the cellulosic material is wood chips.

5. A method according to claim 1 in which liquid is separated from said liquid suspension by passing the suspension across a liquid permeable surface and withdrawing the liquid passing through said surface.

6. Apparatus for controlling the volumetric rate of flow of cellulosic material comprising means for continuously metering a liquid suspension of cellulosic material, a source of a liquid suspension of cellulosic material, liquid suspension conduit connecting said source to said metering means, supplying means for adding liquid to said liquid suspension prior to supplying it to said metering means and thereby regulating the concentration of the cellulosic material in the liquid suspension, a valve for regulating the flow of said added liquid, a separator for continuously separating the liquid component from said liquid suspension, means for delivering the metered liquid suspension to said separating means, a separated liquid conduit for carrying the liquid separated by said separating means, a flow meter for measuring the rate of flow of said separated liquid in said separated liquid conduit, and control means operatively interconnecting said valve with said flow meter for regulating the flow of added liquid through said valve in accordance with the rate of flow of said separated liquid in said conduit, whereby the volume of cellulosic material discharged from said separating means is maintained substantially constant.

7. An apparatus for controlling a volumetric rate of flow of cellulosic material as set forth in claim 6, in which the separating means comprises a liquid permeable surface and conveyor means for moving the liquid suspension across said permeable surface.

8. Apparatus according to claim 6 which includes means in said conduit intermediate said separating means and said flow measuring device for dampening the flow of separated liquid component therethrough and for separating any entrained air therefrom.

9. Apparatus according to claim 6 which includes a collecting tank into which the separated liquid component from the separating means is discharged and from which liquid component may be drawn to be added to the suspension in accordance with the demand of the means for adding liquid component to said suspension.

10. Apparatus according to claim 6 in which the metering device is a positive displacement metering device.

References Cited in the file of this patent

UNITED STATES PATENTS

| | | |
|---|---|---|
| 1,695,380 | Kolitsch | Dec. 18, 1928 |
| 1,925,833 | French | Sept. 5, 1933 |
| 1,982,370 | Carpenter | Nov. 27, 1934 |
| 2,379,835 | Sisler | July 3, 1945 |